United States Patent Office 3,511,812
Patented May 12, 1970

3,511,812
PREPARATION OF POLYESTERS USING CO-CATALYST OF LITHIUM AMIDE AND MANGANIC HYDROXIDE IN TRANSESTERIFICATION REACTION
Mary J. Stewart, Media, Pa., and Philip Michelman, Wilmington, Del., assignors to FMC Corporation, Philadelphia, Pa., a corporation of Delaware
No Drawing. Filed Oct. 23, 1968, Ser. No. 770,062
Int. Cl. C08g 17/013; C07c 67/02; B01i 11/82
U.S. Cl. 260—75                                    6 Claims

ABSTRACT OF THE DISCLOSURE

Process of preparing polyesters comprising carrying out a transesterification reaction between a dialkyl terephthalate and a diol in the presence of lithium amide and manganic hydroxide to form a polyester prepolymer and then polycondensing the resulting polyester prepolymer in the presence of a conventional polycondensation catalyst.

This invention relates to a method of preparing polymeric linear polyesters. More particularly, it relates to an improved method of preparing polyester resins through the use of a novel transesterification catalyst combination.

The manufacture of polyester resin from a dialkyl terephthalate and diol is well-known in the art. Generally, in the preparation of such polyesters, the said dialkyl terephthalate and diol are first combined and subjected to an ester-interchange or a transesterification reaction in the presence of a transesterification catalyst at elevated temperature and at atmospheric pressure. The resulting product or prepolymer is then polycondensed at higher temperature and under reduced pressure in the presence of a polycondensation catalyst to form the desired polyester resin.

Many transesterification catalysts have been suggested heretofore for use in the transesterification stage. However, in general none of these have proven completely satisfactory, since many of those known do not catalyze the ester-interchange reaction at a sufficiently fast rate and others do not act so as to form a prepolymer which can be further processed to form polyester resins having a combination of properties which make them particularly well-suited for the production of melt spun filaments or the manufacture of films.

For example, it is generally considered necessary that a polyethylene terephthalate resin have a carboxyl content value of below 50 equivalents per million grams (eq./$10^6$ gr. or meq./kg.) a melting point of preferably at least about 258° C. to 260° C., a diethylene glycol content of less than about 1% by weight and an intrinsic viscosity preferably not less than about 0.60 (as determined in a 60% phenon-50% tetrachloroethane solution, wt./wt. at 30° C.) in order to produce fibers therefrom which possess a satisfactorily high level of hydrolytic stability, heat stability, ultra-violet stability and a high degree of tenacity.

Additionally, it is essential for commercial purposes that the polyester resin be produced in the shortest possible time and that the desired degree of ester-interchange and polymerization be consecutively obtained. One way of evaluating the effectiveness of a transesterification catalyst is by measuring the volume of lower alkyl alcohol per unit time which is given off as the transesterification reaction proceeds. When dimethyl terephthalate is the ester reactant, the lower alkyl alcohol produced will obviously be methyl alcohol. Another indication of the effectiveness of a transesterification catalyst, which is directly related to the amount of lower alkyl alcohol given off, is the length of time which is required to drive the ester-interchange reaction to calculated theoretical completion.

It is an object of this invention to prepare polyester resin by a transesterification and polycondensation process.

An additional object of the present invention is to provide an improved method for carrying out a transesterification reaction between a dialkyl terephthalate and a diol in the preparation of polyester resin.

A further object of this invention is to provide a transesterification catalyst system which is particularly effective in catalyzing an ester-interchange reaction between a suitable dialkyl ester of an aromatic dicarboxylic acid, having no olefinic unsaturation, and a dihydric alcohol in the preparation of polyester resins.

These and other objects are accomplished in accordance with the present invention which involves a method of preparing polyalkylene terephthalates wherein a lower dialkyl terephthalate and a dihydric alcohol are transesterified and the resulting transesterified product is polycondensed in the presence of a polycondensation catalyst, the improvement comprising carrying out the said transesterification in the presence of catalytic amounts of lithium amide and manganic hydroxide. The terms "lower alkyl" or "dialkyl" is used herein to denote alkyl groups having from 1 to 6 carbon atoms.

In general, the subject transesterification catalyst combination is employed in concentrations ranging from about 0.01% to about 0.20% combined total weight based on the weight of lower dialkyl terephthalate in the subject dialkyl terephthalate-dihydric alcohol reaction mixture. In most instances it has been found that from about 0.02% to about 0.10% combined total weight of lithium amide and manganic hydroxide, based on the weight of dialkyl terephthalate in the reaction mixture, is preferred to catalyze the present transesterification reaction. Greater or smaller concentrations of the present catalysts can also be used. However, when concentrations less than the above are used, the catalytic effect is generally reduced, whereas when greater concentrations than this are used, no further improvement in the present method or desired product is obtained.

In the practice of the present invention, it has been determined that the preferred dihydric alcohol or diol to be used are those of the series $HO(CH_2)_nOH$, wherein $n$ equals 2 to 10 carbon atoms.

It has been determined that the percentages of manganic hydroxide and lithium amide in the present catalyst combination can be varied over a large concentration. That is, the subject transesterification catalyst may contain from 35% to 85% manganic hydroxide and from 65% to 15% lithium amide. Using a combination of manganic hydroxide and lithium amide as a transesterification catalyst within the above concentrations results in a catalysis of the transesterification reaction at an improved rate. In most instances, however, it has been found that it is preferred to use a combination of manganic hydroxide and lithium amide wherein 40% to 75% of manganic hydroxide and 60% to 25% lithium amide is present in the catalyst combination.

The subject transesterification catalyst combination can be added to the reactants in various manners. It has been found that lithium amide and maganic hydroxide can be added as a mixture or singularly to the reactants before the transesterification reaction is begun. Also, it has been found that a mixture of the lithium amide and manganic hydroxide can be added portionwise to the transesterification reactants over a period of time from the start of the transesterification reaction up to about 120 minutes after the transesterification reaction has been started. Additionally, it has been found that the present combination of lithium amide and manganic hydroxide may be added to the transesterification reaction mixture singularly in sequence. That is, the lithium amide portion may be first added to the reaction mixture all at one time or over a period of about up to 90 minutes followed by the addition of the manganic hydroxide over a similar period of time. Thus, the present method includes the addition of a mixture of lithium amide and manganic hydroxide, or the addition of lithium amide to the reaction mixture followed by the subsequent addition of manganic hydroxide.

In general, the preparation of film and filament-forming polyesters of the present invention via the transesterification reaction method is carried out with a molar ratio of diol to lower dialkyl terephthalate of from about 1:1 to about 15:1, but preferably from about 1.2:1 to about 2.6:1. The transesterification reaction is generally carried out at atmospheric pressure in an inert atmosphere such as nitrogen, initially at a temperature range from about 125° C. to about 250° C. but preferably from about 150° C. and 200° C. in the presence of a transesterification or ester-interchange catalyst. During this first stage, the corresponding lower alkyl alcohol of the dialkyl terephthalate used is evoled and is continuously removed by distillation. After a reaction preiod of about one to three hours, the temperature of the reaction mixture is raised from about 200° C. to about 300° C. over an approximate one-half to two hour period in order to complete the reaction and distill off any excess glycol which is present. The desired product of the ester-interchange reaction is a prepolymer which can be effectively condensed into a highly polymeric linear polyester resin. In the case where the initial reactants are dimethyl terephthalate and ethylene glycol, the prepolymer product is comprised principally of bis(2-hydroxyethyl) terephthalate.

The second stage or polycondensation step of the present method is generally carried out under reduced pressure within the range of about 0.05 to 20 mm. of mercury at a temperature of from about 225° C. to about 325° C. for about two to five hours.

The polycondensation step of the present method is accomplished with the addition of a suitable polycondensation catalyst; for example, antimony trioxide and the like. The polycondensation catalyst may be added to the reaction mixture before initiating the transesterification reaction or at any convenient stage thereafter. However, in most instances, the polycondensation catalyst is added after the prepolymer has been formed. The polycondensation catalysts are generally employed in amounts ranging from about 0.005% to about 0.5% based on the total weight of prepolymer.

The following examples of preferred embodiments of the persent invention will further serve to illustrate the subject invention. All parts are by weight unless otherwise indicated.

EXAMPLE I

A mixture comprising 600 grams of dimethyl terephthalate, 396 mls. of ethylene glycol and a total of 0.12 gram of a transesterification catalyst (as shown in Table 1) was charged into a reaction vessel equipped with a nitrogen inlet, a distillation arm, heating means, and stirring means. The reaction mixture was agitated and heated at atmospheric pressure to about 197° C. over a period of about 30 minutes under a nitrogen blanket whereby by-product methyl alcohol was distilled off. The reaction mixture was held at about 197° C. for about two hours. Then, the temperature of the reaction mixture was allowed to rise in order to distill off any remaining by-product methyl alcohol and excess ethylene glycol and form the desired polyester prepolymer product. After about 30 minutes, the temperature had risen to about 230° C. at which time the prepolymer product was cooled under an atmosphere of nitrogen.

Fifty grams of the prepolymer formed was combined with 0.02 gram of antimony oxalate in a reaction vessel equipped with a nitrogen inlet, vacuum source, a distillation arm, stirring means, and heating means. The pressure within the reaction vessel was reduced to about 0.05 mm. of mercury at about 280° C. and the reaction mixture was maintained under these conditions for about two hours under agitation to bring about the polycondensation of the prepolymer and formation of the polyester resin.

The transesterification catalysts used and the analytical values of the polymers produced with the respective catalystst per the above procedures are shown in the following Table 1:

TABLE 1

| Transesterification catalyst used | Activation temp.[1] (° C.) | Rate, mls. CH$_3$OH/minute produced | | |
|---|---|---|---|---|
| | | Stage 1[2] | Stage 2[3] | Stage 3[4] |
| (1) Lithium amide [LiNH$_2$] | 119 | 4.5 | 1.0 | 0.8 |
| (2) Manganic hydroxide [MnO(OH)] | 172 | 8.9 | 5.0 | 1.5 |
| (3) Lithium amide and manganic hydroxide [LiNH$_2$]+ [MnO(OH)] (used 0.06 grams of each) | 121 | 5.8 | 3.7 | 1.5 |

[1] Activation temp.—Temperature when CH$_3$OH first distilled off.
[2] Stage 1—Time zero to 50% theoretical conversion to bis (2-hydroxyethyl) terephthalate.
[3] Stage 2—50% to 80% theoretical conversion to bis (2-hydroxyethyl) terephthalate.
[4] Stage 3—80% to 90% theoretical conversion to bis (2-hydroxyethyl) terephthalate.

The prepolymer formed above in the transesterification reaction (1) wherein lithium amide was the sole transesterification catalyst, was polycondensed as indicated under the conditions set forth in Example I above. The resulting polyethylene terephthalate resin had an intrinsic viscosity of 0.67, a carboxyl content value of about 8 (meq./kg.), and a melting point of about 265° C.

The prepolymer formed above in the transesterification reaction (2) wherein manganic hydroxide was the sole transesterification catalyst, was polycondensed as indicated under the conditions set forth in Example I above. The resulting polymer had an intrinsic viscosity of 0.67, a carboxyl content value of about 8 (meq./kg.), and a melting point of about 261° C.

The prepolymer formed above in the transesterification reaction (3) wherein a combination of lithium amide and manganic hydroxide was the transesterification catalyst, was polycondensed as indicated under the conditions set forth in Example I above. The resulting polyethylene terephthalate resin had an intrinsic viscosity of 0.69, a carboxyl content value of about 10 (meq./kg.) and a melting point of about 265° C.

EXAMPLE II

One hundred pounds of dimethyl terephthalate and 63 pounds of ethylene glycol were charged into a 20 gallon stainless steel reactor equipped with a nitrogen inlet, distillation means, heating means, and stirring means. The reaction mixture was agitated and heat was applied at atmospheric pressure. When the temperature of the reaction mixture reached approximately 270° F., the addition of 18.2 grams of lithium amide dispersed in 4 pounds of ethylene glycol to the reaction mixture was commenced and continued for a 60 minute period until all the catalyst had been added. The log of this transesterification reaction is set forth below in table form, indicating reaction time lapse after the first portion of the catalyst had been added to the reaction mixture, temperatures of the reaction mixture, the amount of methyl alcohol given off in pounds per minute, and the calculated percentage conversion or transesterification at various times during the reaction.

| Time lapse in minutes | Temperature degrees Fahrenheit | Lbs. CH₃OH/ min. | Calculated percent conversion |
|---|---|---|---|
|  | 270 |  |  |
| 26 | 302 |  | 13.0 |
| 36 | 290 | 0.42 | 26.0 |
| 41 | 298 | 0.387 | 39.0 |
| 64 | 329 | 0.25 | 51.5 |
| 131 | 412 | 0.0635 | 63.0 |
| 175 | 447 | 0.097 | 77.0 |
| 196 | 455 | 0.048 | 84.0 |
| 216 | 461 | 0.038 | 84.0 |

EXAMPLE III

One hundred pounds of dimethyl terephthalate and 63 pounds of ethylene glycol were charged into a 20 gallon stainless steel reactor equipped with a nitrogen inlet, distillation means, heating means, and stirring means. The reactants were agitated and heat was applied at atmospheric pressure. When the temperature of the reaction mixture reached approximately 270° F., the addition of 4.5 grams of lithium amide dispersed in 1 pound of ethylene glycol to the reaction mixture was commenced and continued for a 26 minute period until all the lithium amide catalyst had been added. Twenty-eight minutes after the first addition of the lithium amide catalyst, the addition to the reaction mixture of 14.0 grams of manganic hydroxide dispersed in 3 pounds of ethylene glycol was commenced and continued for 32 minutes until all of the manganic hydroxide catalyst had been added. The log of this transesterification reaction is set forth below in table form as in Example II above.

| Time lapse in minutes | Temperature degrees Fahrenheit | Lbs. CH₃OH/ min. | Calculated percent conversion |
|---|---|---|---|
|  | 270 |  |  |
| 17 | 318 |  | 12.0 |
| 22 | 314 | 0.82 | 25.0 |
| 26 | 310 | 0.27 | 36.0 |
| 33 | 308 | 0.60 | 49.0 |
| 58 | 341 | 0.21 | 62.0 |
| 96 | 388 | 0.115 | 74.0 |
| 131 | 423 | 0.115 | 86.0 |

EXAMPLE IV

One hundred pounds of dimethyl terephthalate and 53 pounds of ethylene glycol were charged into a 20 gallon stainless steel reactor equipped with a nitrogen inlet, distillation means, heating means, and stirring means. The reactants were agitated and heat was applied at atmospheric pressure. When the temperature of the reaction mixture reached approximately 270° F., the addition of 23 grams of lithium amide dispersed in 14 pounds of ethylene glycol to the reaction mixture was commenced and continued for a 120 minute period until all the lithium amide had been added. The log of this reaction is set forth below in table form as in Example II above.

| Time lapse in minutes | Temperature degrees Fahrenheit | Lbs. CH₃OH/ min. | Calculated percent conversion |
|---|---|---|---|
|  | 270 |  |  |
| 35 | 321 |  | 12.6 |
| 76 | 360 | 0.11 | 25.0 |
| 96 | 371 | 0.21 | 37.5 |
| 13 | 381 | 0.098 | 50.0 |
| 164 | 405 | 0.122 | 62.5 |
| 213 | 418 | 0.084 | 74.0 |
| 239 | 430 | 0.12 | 85.0 |

EXAMPLE V

One hundred pounds of dimethyl terephthalate and 53 pounds of ethylene glycol were charged into a 20 gallon stainless steel reactor equipped with nitrogen inlet, distillation means, heating means and stirring means. The reactants were agitated and heat was applied at atmospheric pressure. When the temperature of the reaction mixture reached approximately 270° F., the addition of 10 grams of lithium amide dispersed in 10 pounds of ethylene glycol to the reaction mixture was commenced and continued for a 90 minute period until all the lithium amide had been added. Ninety minutes after the first addition of the lithium amide, the addition to the reaction mixture of 13.0 grams of manganic hydroxide dispersed in 4 pounds of ethylene glycol was commenced and continued for 29 minutes until all the manganic hydroxide dispersion had been added. The log of this reaction is set forth below in table form as in Example II before.

| Time lapse in minutes | Temperature degrees Fahrenheit | Lbs. CH₃OH/ min. | Calculated percent conversion |
|---|---|---|---|
|  | 270 |  |  |
| 15 | 303 |  | 12.5 |
| 21 | 316 | 0.67 | 25.0 |
| 29 | 321 | 0.50 | 36.5 |
| 36 | 331 | 0.67 | 48.5 |
| 75 | 389 | 0.11 | 61.0 |
| 120 | 400 | 0.095 | 74.0 |
| 142 | 425 | 0.192 | 87.0 |

EXAMPLE VI

One hundred pounds of dimethyl terephthalate and 58 pounds of ethylene glycol were charged into a 20 gallon stainless steel reactor as in Example V above. The reaction mixture was agitated and heat was applied at atmospheric pressure. When the temperature of the reaction mixture reached approximately 270° F., the addition of 9.0 grams of lithium amide dispersed in 7 pounds of ethylene glycol to the reaction mixture was commenced and continued for a 60 minute period until all the lithium amide dispersion had been added. Sixty minutes after the first addition of the lithium amide dispersion, the addition to the reaction mixture of 9.0 grams of manganic hydroxide dispersed in 2 pounds of ethylene glycol was commenced and continued for a 20 minute period until all the manganic hydroxide dispersion had been added. The log of this reaction is set forth below in table form as in Example II hereinbefore.

| Time lapse in minutes | Temperature degrees Fahrenheit | Lbs. CH₃OH/ min. | Calculated percent conversion |
|---|---|---|---|
|  | 270 |  |  |
| 16 | 295 |  | 12.9 |
| 22 | 308 | 0.53 | 25.6 |
| 30 | 311 | 0.71 | 38.5 |
| 38 | 320 | 0.52 | 51.5 |
| 48 | 340 | 0.53 | 65.0 |
| 60 | 362 | 0.42 | 78.0 |
| 143 | 418 | 0.354 | 91.0 |
| 188 | 441 | 0.051 | 96.5 |
|  |  | 0.096 |  |

The intrinsic viscosity of the polymers set forth in the above examples were determined in a 60% phenol and 40% tetrachloroethane solution, wt./wt. at 30° C. The other analytical values set forth above were obtained by conventional laboratory procedures.

The results in Example I, Table 1, conclusively illustrates the effectiveness of the present method in the transesterification reaction between a suitable diol and ester of a dicarboxylic acid. It is to be noted that the activation temperature of the mixture of lithium amide and manganic hydroxide is quite like that of the lithium amide itself. Whereas the activation temperature of manganic hydroxide is considerably higher. Therefore, with the present method it is possible to commence the transesterification reaction at a relatively low temperature and to maintain an improved reaction rate as indicated by the milliliters of methanol which were produced per minute as the transesterification reaction proceeded.

Examples II through VI show the relative effectiveness of lithium amide and various combinations of lithium amide and manganic hydroxide during transesterification reactions when added at different intervals of the said reaction. In Examples II, III, IV, V, and VI the catalysts were added over a period of time after the temperature of the reaction mixtures had reached approximately 270° F.

On comparing Examples II and III wherein similar process steps were used but with different catalyst systems, it is readily noted that the process of Example III results in a much faster reaction rate and at lower temperatures. Also, a comparison of Examples IV and V wherein the same concentration of catalysts and process steps were used, indicates the improved results of the present invention.

We claim:

1. In a process for the preparation of polyester resins wherein a low dialkyl terephthalate and a dihydric alcohol are transesterified and the resulting transesterified product is polycondensed in the presence of a polycondensation catalyst, the improvement comprising carrying out the said transesterification reaction in the presence of a catalytic amount of a transesterification catalyst combination which contains from 35% to 85% manganic hydroxide and from 65% to 15% lithium amide.

2. The process of claim 1 wherein the dialkyl terephthalate is dimethyl terephthalate.

3. The process of claim 1 wherein the dihydric alcohol is ethylene glycol.

4. The process of claim 1 wherein the lithium amide and manganic hydroxide are present in a combined total of from about 0.01% to about 0.20% based on the weight of the lower dialkyl terephthalate.

5. The process of claim 1 wherein the lithium amide and manganic hydroxide are added to the dialkyl terephthalate and dihydric alcohol before the transesterification reaction is commenced.

6. The process of claim 1 wherein lithium amide and manganic hydroxide were added sequentially to dialkyl terephthalate and dihydric alcohol reactants.

References Cited

UNITED STATES PATENTS 3,420,803  1/1969  Price et al. _____ 260—75

WILLIAM H. SHORT, Primary Examiner

L. P. QUAST, Assistant Examiner

U.S. Cl. X.R.

252—438; 260—475

UNITED STATES PATENT OFFICE
CERTIFICATE OF CORRECTION

Patent No. 3,511,812    Dated  5/12/70

Inventor(s)  Mary J. Stewart   and   Philip Michelman

It is certified that error appears in the above-identified patent and that said Letters Patent are hereby corrected as shown below:

Column 1, line 56, "phenon-50%" should read --phenol-40%--. Column 2, line 64, "maganic" should read --manganic--. Column 3, line 24, "evolved" should read --evolved--; line 25, "preiod" should read --periods--; line 54, "persent" should read --present--. Column 5, line 9, "84" in last column (first occurrence) should be --81.0--; line 60, "13" in first column should be --130--.

SIGNED AND
SEALED
SEP 15 1970

(SEAL)
Attest:

Edward M. Fletcher, Jr.

Attesting Officer

WILLIAM E. SCHUYLER, JR.
Commissioner of Patents